Patented Oct. 11, 1932

1,882,289

UNITED STATES PATENT OFFICE

ERNEST JOSEPH LUSH, OF LONDON, ENGLAND

PURIFICATION OF GASES

No Drawing. Application filed October 20, 1930, Serial No. 490,097, and in Great Britain October 31, 1929.

Recently there has been an increased demand for hydrogen due to the catalytic processes for the production of synthetic ammonia, synthetic methanol and fatty oil hydrogenation which has led to an increase in the production of hydrogen from coal. Hydrogen obtained from coal contains sulphur compounds such as carbon bisulphide and carbon oxysulphide which have hitherto only been removed at considerable cost, and even then not always completely.

Further, industrial gases such as coal gas, coke oven gas, carburetted water gas and producer gas are all liable to contain these sulphur compounds which for many purposes it may be desirable to remove.

Or again it may be desired to remove such sulphur compounds from air as in viscose artificial silk works, rubber works and carbon bisulphide factories, or other factories employing carbon bisulphide.

The object of the present invention is to simplify the method of freeing these gases from such deleterious sulphur compounds and for this purpose use is made of piperidine or its homologues, hereinafter referred to as piperidine, since piperidine can be made sufficiently economically for the purposes hereinafter described by the process as set out in my Patent No. 1,519,035 and my pending application for patent Serial No. 316,884 filed November 2nd, 1928.

I have found that when for example, coal gas is passed through piperidine dissolved in a suitable solvent the carbon bisulphide and oxysulphide are almost completely removed.

I have found that the piperidine may also be used in the form of a compound which is readily dissociable such as are its compounds with carbon dioxide. The carbon dioxide compounds may be used in the dry state or in suspension in a liquid or in solution in a suitable solvent.

Alternatively, the piperidine may be added to the gas in the form of vapour where it combines with the carbon bisulphide or oxysulphide to produce crystalline compounds which may be removed from the gas stream in known manner.

I have further found that the crystalline compounds produced by the reaction between the piperidine or piperidine compounds and carbon bisulphide or oxysulphide can be treated for the recovery of both the piperidine and the carbon bisulphide or oxysulphide by submitting the compounds in the presence of water to the action of carbon dioxide under pressure when piperidine carbonate is formed and carbon bisulphide or oxysulphide is set free. Or alternatively, the compounds may be decomposed by means of acid whereby the carbon bisulphide and oxysulphide are set free and the piperidine salt thereby produced may be treated with alkali to regenerate the piperidine.

When piperidine or its compounds are used in solution or suspension the choice of liquid medium depends on the characteristics of the gas to be treated. In general, a wide range of solvents may be used, as for example, hydrocarbon oils including coal tar and mineral oils, mono- and polyhydric alcohols and ketones. The solvents used should preferably be those of low volatility so that they are not carried away in the purified gas stream.

Water itself may be used, but owing to its low solvent power for carbon bisulphide and/or carbon oxysulphide its use is not so advantageous. Also, when the gas contains moisture it is preferable that solvents miscible with water should not be used on account of their consequent dilution. Moreover, when the gas contains carbon dioxide it may, in presence of water, lead to partial dissociation of the carbon bisulphide and oxysulphide compounds with piperidine so that the removal of the carbon bisulphide and/or carbon oxysulphide from the gas stream is less complete.

In certain cases, for example, when piperidine carbonate is used, it may be thought desirable to use water as a solvent to increase its concentration. In such a case it is desirable to use an aqueous solution of piperidine carbonate in the presence of a suitable oil immiscible with water which increases the solubility of the carbon bisulphide and/or carbon oxysulphide. The piperidine may also be used instead of or in conjunction with ammonia used with copper salts to remove carbon monoxide from industrial gases in known manner.

The following examples illustrate the invention as applied to the particular case of the removal of carbon bisulphide and oxysulphide from coal gas. As will be seen from the first of the following examples, the process can form part of one for recovery of benzol from coal gas.

Example 1

Coal gas, substantially freed from hydrogen sulphide, ammonia and tarry impurities and containing 30–40 grains per 100 cu. ft. of sulphur present as carbon bisulphide and oxysulphide is passed through one or more washers or scrubbers of suitable design through which a solution of piperidine or compound of piperidine with carbon dioxide in gas oil is circulated in counter current to the gas. The oil should for preference not contain more piperidine than will remain dissolved in the oil after being converted to its carbon dioxide compound. With wet gas this will be not more than 1%, but if the gas should previously have been dried, higher concentrations may be used without any separation on carbonation. (The solubility of the dry compound formed from piperidine and carbon dioxide may be as high as 10–15% in gas oil, but with the addition of water the bulk of the dissolved solid is precipitated). The quantity of oil to be circulated is dependent on the concentration of the dissolved piperidine being about 3000–4000 galls. per million cu. ft. of gas for a 1% solution.

To recover the traces of piperidine volatilized from the washers, the purified gas is passed through one or more scrubbers in which piperidine-free gas oil, or cold water, or dilute sulphuric acid is circulating whereby the piperidine present in the state of vapour may be completely removed. The oil leaving the system is filtered, as soon as is necessary, to remove the piperidine-carbon bisulphide compounds precipitated and if recovery of benzol is desired, the oil is then distilled to remove the benzol. The oil is then returned to the system after the addition of fresh piperidine or compound of piperidine with carbon dioxide to replace that removed by reaction with carbon bisulphide and/or oxysulphide or by volatilization. Alternatively, if sufficiently free from piperidine, the filtered oil may first be used to scrub the purified gas to free it from piperidine volatilized from the washers. The solution of piperidine in gas oil before being returned to the washers, can first be treated with carbon dioxide or with a gas containing carbon dioxide to convert the base to its carbon dioxide compound.

The solid compounds of piperidine with carbon bisulphide and oxysulphide removed by filtration are treated in a steam heated vessel provided with an acid resistant lining, with a sufficient quantity of dilute sulphuric acid of about 30–40% strength which may in part consist of acid used in washing piperidine from the purified gas to liberate all the carbon bisulphide and oxysulphide when the carbon disulphide may be recovered by distillation.

The remaining solution of piperidine sulphate is treated with a solution of caustic soda of 20–30% strength in quantity sufficient to neutralize all the sulphuric acid previously used, when two layers separate the upper layer consisting of a piperidine-water solution and the lower layer of saturated sodium sulphate solution. The piperidine water solution is separated and treated with solid granulated caustic soda which removes the water, the caustic soda solution produced separating as a lower layer which can be removed and used in the neutralization of the piperidine sulphate solution.

The dried piperidine is recovered for further use.

Example 2

Coal gas, substantially freed from hydrogen sulphide, ammonia and tarry impurities and containing 30–40 grains per 100 cu. ft. of sulphur present as carbon bisulphide and oxysulphide is passed through several washers or scrubbers of suitable design containing an intimate mixture of one part by volume of a 50% aqueous solution of piperidine carbonate with two parts by volume of gas oil. 100–500 galls. of the mixture of gas oil and piperidine carbonate solution are required per million cu. ft. of gas treated. Traces of piperidine volatilized from the washers are removed by a further washing of the gas with water or dilute sulphuric acid. The crystals of the compounds of carbon bisulphide and carbon oxysulphide with piperidine are removed by filtration and treated in water suspension in an enamel lined autoclave with carbon dioxide under a pressure of 30–50 atmospheres. The carbon disulphide set free forms a lower layer which can be discharged from the autoclave under pressure into a second pressure vessel in which it is washed while still under pressure with a small proportion of caustic alkali or alkali carbonate just sufficient to remove the dissolved carbon dioxide. From the solution of piperidine carbonate remaining, the piperidine can readily be recovered for re-use in the process.

What I claim is:—

1. A process of freeing industrial gases of sulphur compounds and carbon sulphides which consists in subjecting the gas to be purified to the action of piperidine.

2. A process of freeing industrial gases of sulphur compounds and carbon sulphides which consists in subjecting the gas to be purified to the action of the homologues of piperidine.

3. A process of freeing industrial gases of sulphur compounds and carbon sulphides which consists in passing the gas to be purified through a solution of piperidine.

4. A process of freeing industrial gases of sulphur compounds and carbon sulphides which consists in passing the gas to be purified through a solution of the homologues of piperidine.

5. A process of freeing industrial gases of sulphur compounds and carbon sulphides which consists in adding piperidine in vapor form to the gas to be cleansed.

6. A process of freeing industrial gases of sulphur compounds and carbon sulphides which consists in treating the gas with piperidine carbonate instead of piperidine substantially as described.

7. A process of freeing industrial gases of sulphur compounds and carbon sulphides which consists in subjecting the gas to be purified to the action of piperidine compounds simultaneously with known processes of removing carbon monoxide and benzol from the gases.

8. A process of freeing industrial gases of sulphur compounds and carbon sulphides which consists in subjecting the gas to be purified to the action of piperidine, subsequently effecting the recovery on the one hand of the piperidine and its homologues and on the other of the sulphur compounds by subjecting the same to the action of acids and finally treating the piperidine salts with alkali substantially as described.

In testimony whereof I affix my signature.

ERNEST JOSEPH LUSH.